US009015365B2

(12) United States Patent
Chang et al.

(10) Patent No.: US 9,015,365 B2
(45) Date of Patent: Apr. 21, 2015

(54) INTEGRATED CIRCUIT USING I²C BUS AND CONTROL METHOD THEREOF

(71) Applicant: Via Technologies, Inc., New Taipei (TW)

(72) Inventors: Kuo-Han Chang, New Taipei (TW); Xiaolu Yang, Beijing (CN)

(73) Assignee: Via Technologies, Inc., New Taipei (TW)

( * ) Notice: Subject to any disclaimer, the term of this patent is extended or adjusted under 35 U.S.C. 154(b) by 0 days.

(21) Appl. No.: 13/953,441

(22) Filed: Jul. 29, 2013

(65) Prior Publication Data

US 2014/0223041 A1 Aug. 7, 2014

(30) Foreign Application Priority Data

Feb. 1, 2013 (CN) .......................... 2013 1 0042462

(51) Int. Cl.
G06F 3/00 (2006.01)
G06F 13/00 (2006.01)
G06F 13/28 (2006.01)

(52) U.S. Cl.
CPC ...................................... G06F 13/28 (2013.01)

(58) Field of Classification Search
None
See application file for complete search history.

(56) References Cited

U.S. PATENT DOCUMENTS

| 7,979,611 | B2 * | 7/2011 | Park ................................. 710/65 |
| 8,487,655 | B1 * | 7/2013 | Kutz et al. ........................ 326/86 |
| 2004/0268138 | A1 * | 12/2004 | Larson et al. ................. 713/200 |
| 2005/0235159 | A1 * | 10/2005 | Anandakumar et al. ...... 713/185 |
| 2006/0271717 | A1 * | 11/2006 | Koduri et al. .................. 710/241 |
| 2008/0278508 | A1 * | 11/2008 | Anderson et al. ............. 345/519 |
| 2009/0033359 | A1 * | 2/2009 | Rofougaran ..................... 326/39 |
| 2011/0255593 | A1 * | 10/2011 | Weinstock et al. ........ 375/240.2 |

FOREIGN PATENT DOCUMENTS

| CN | 1558332 | 12/2004 |
| CN | 101127023 | 2/2008 |

OTHER PUBLICATIONS

English language translation of abstract of CN 1558332 (published Dec. 29, 2004).
English language translation of abstract of CN 101127023 (published Feb. 20, 2008).

* cited by examiner

Primary Examiner — Michael Sun
(74) Attorney, Agent, or Firm — McClure, Qualey & Rodack, LLP

(57) ABSTRACT

An integrated circuit for controlling a slave device is provided. The integrated circuit includes a pin, a micro-controller and an inter integrated circuit (I²C) bus controller coupled between the micro-controller and the pin. The I²C bus controller includes a transceiver unit coupled to the slave device via the pin, and an interface unit coupled between the transceiver unit and the micro-controller. The interface unit includes a start control register and a stop control register. The start control register provides a start signal to the slave device via the transceiver unit when the start control register is programmed by the micro-controller. The stop control register provides a stop signal to the slave device via the transceiver unit when the stop control register is programmed by the micro-controller. The micro-controller programs the stop control register according to an interrupt signal from the interface unit.

19 Claims, 4 Drawing Sheets

INTEGRATED CIRCUIT USING I²C BUS AND CONTROL METHOD THEREOF

CROSS REFERENCE TO RELATED APPLICATIONS

This Application claims priority of China Patent Application No. 201310042462.5, filed on Feb. 1, 2013, the entirety of which is incorporated by reference herein.

BACKGROUND OF THE INVENTION

1. Field of the Invention

The invention relates to an Inter Integrated Circuit (I²C) bus controller, and more particularly, to an I²C bus controller capable of flexibly modifying a transmission format.

2. Description of the Related Art

An Inter Integrated Circuit (I²C) bus is a universal bus standard for an integrated circuit (IC). The I²C bus is a two-lined serial bus standard invented by the Philips Company, wherein a clock (SCL) and a data (SDA) are utilized to define received and transmitted data between ICs.

FIG. 1 is a schematic diagram illustrating the conventional operation of an I²C bus between two ICs. Each of the ICs 110 and 120 has a SCL pin and a SDA pin, wherein the SCL pins of the ICs 110 and 120 are coupled together via a transmission line 130, and the SDA pins of the ICs 110 and 120 are coupled together via a transmission line 140. The IC 110 is a master IC and the IC 120 is a slave IC, wherein the control commands from the IC 110 are transmitted to the IC 120 via the transmission lines 130 and 140.

The I²C bus has various transmission formats. Therefore, it is desirable that an I²C bus controller is compatible with various transmission formats and is capable of flexibly modifying the transmission format.

BRIEF SUMMARY OF THE INVENTION

An integrated circuit and a control method for an inter integrated circuit (I²C) bus controller are provided. An embodiment of an integrated circuit for controlling a slave device is provided. The integrated circuit comprises: a pin; a micro-controller; and an inter integrated circuit (I²C) bus controller coupled between the micro-controller and the pin. The I²C bus controller comprises: a transceiver unit coupled to the slave device via the pin; and an interface unit coupled between the transceiver unit and the micro-controller. The interface unit comprises: a start control register, providing a start signal to the slave device via the transceiver unit when the start control register is programmed by the micro-controller; and a stop control register, providing a stop signal to the slave device via the transceiver unit when the stop control register is programmed by the micro-controller. The micro-controller programs the stop control register according to an interrupt signal from the interface unit.

Furthermore, an embodiment of a control method for an inter integrated circuit (I2C) bus controller is provided, wherein the I2C bus controller is coupled to a slave device. A packet comprising a plurality of signals is provided to the slave device by programming a plurality of registers of the I2C bus controller, wherein the packet has a specific format, and the specific format of the packet comprises a first start signal and a stop signal. The first start signal is generated by programming a start control register of the I2C bus controller, and the stop signal is generated by programming a stop control register of the I2C bus controller.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
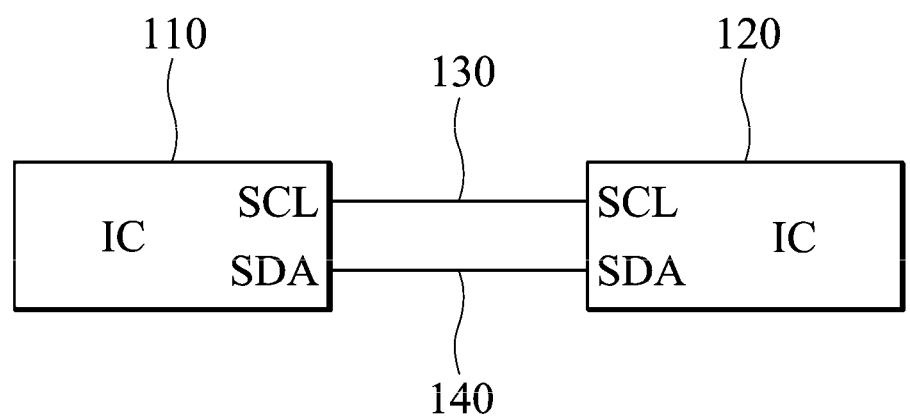
FIG. 1 is a schematic diagram illustrating the conventional operation of an I²C bus between ICs.
Figure 2:
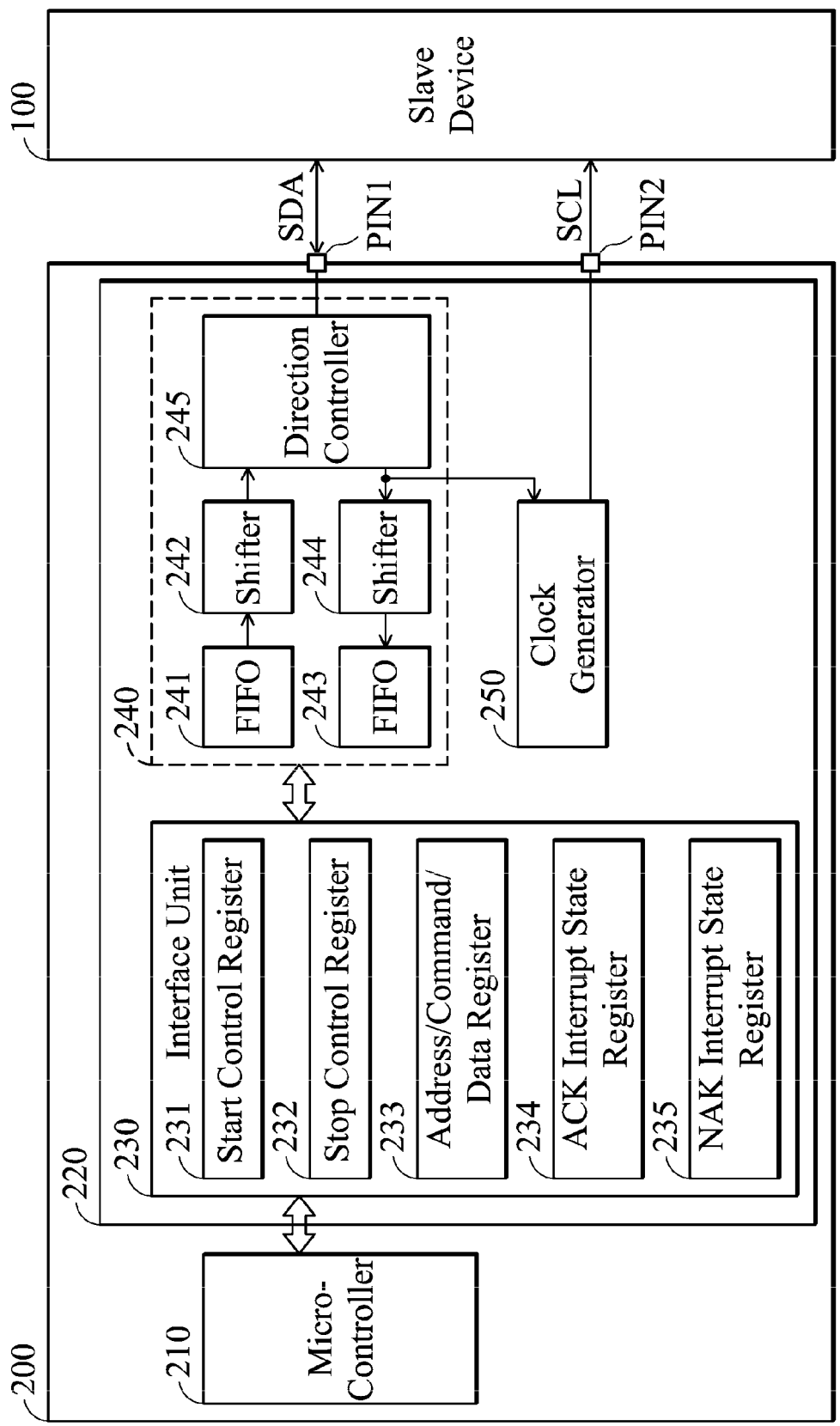
FIG. 2 shows an integrated circuit (IC) according to an embodiment of the invention.

FIG. 2 shows an integrated circuit (IC) 200 according to an embodiment of the invention. The IC 200 is a master IC, wherein the IC 200 communicates with a slave device 100 via a clock signal SCL and a data signal SDA. The IC 200 comprises a micro-controller 210, an Inter Integrated Circuit (I²C) bus controller 220 and the pins PIN1 and PIN2, wherein the IC 200 is coupled to the slave device 100 via the pins PIN1 and PIN2. The I²C bus controller 220 comprises an interface unit 230, a transceiver unit 240 and a clock generator 250. The interface unit 230 comprises a start control register 231, a stop control register 232, an address/command/data register 233, an acknowledgement (ACK) interrupt state register 234 and a non-acknowledgement (NAK) interrupt state register 235. The transceiver unit 240 comprises the First In First Out (FIFO) registers 241 and 243, the shifters 242 and 244 and a direction controller 245. The FIFO register 241 is coupled to the start control register 231, the stop control register 232 and the address/command/data register 233. The FIFO register 241 can register the signals from the start control register 231, the stop control register 232 or the address/command/data register 233, so as to provide the registered information to the shifter 242. Thus, the direction controller 245 can provide the information from the FIFO register 241 to the slave device 100 via the shifter 242. Furthermore, the FIFO register 243 is coupled to the address/command/data register 233, the acknowledgement interrupt state register 234 and the non-acknowledgement interrupt state register 235. The FIFO register 243 registers an acknowledgement signal, a non-acknowledgement signal or an address/command/data signal from the slave device 100 via the direction controller 245 and the shifter 244, so as to provide the registered information corresponding to the acknowledgement signal, the non-acknowledgement signal and the address/command/data signal to the acknowledgement interrupt state register 234, the non-acknowledgement interrupt state register 235 and the address/command/data register 233 of the interface unit 230, respectively. Moreover, the clock generator 250 provides the serial clock signal SCL to the slave device 100 via the pin PIN2. In the IC 200, the micro-controller 210 programs the registers of the interface unit 230 according to software or firmware, to control the serial data signal SDA transmitted to the slave device 100 and receive the serial data signal SDA from the slave device 100. In the embodiment, the slave device 100, for example, is an I²C slave device. In FIG. 2, the micro-controller 210 programs the start control register 231, so as to transmit a start signal S to the slave device 100 via the FIFO register 241, the shifter 242 and the direction controller 245 of the transceiver unit 240. The micro-controller 210 programs the stop control register 232, so as to transmit a stop signal P to the slave device 100 via the FIFO register 241, the shifter 242 and the direction controller 245 of the transceiver unit 240. The micro-controller 210 programs the address/command/data register 233, so as to transmit the corresponding signal (e.g. a address signal ID, a read signal R, a write signal W or a data signal DATA) to the slave device 100 via the FIFO register 241, the shifter 242 and the direction controller 245 of the transceiver unit 240. Furthermore, the micro-controller 210 reads the address/command/data register 233, so as to receive the data signal DATA from the slave device 100 via the direction controller 245, the shifter 244 and the FIFO register 242. The micro-controller 210 programs the acknowledgement interrupt state register 234 and the non-acknowledgement interrupt state register 235, so as to respectively transmit an acknowledgement signal As and a non-acknowledgement signal ~Am to the slave device 100 via the FIFO register 241, the shifter 242 and the direction controller 245 of the transceiver unit 240. In addition, the acknowledgement interrupt state register 234 provides a first interrupt signal to the micro-controller 210 when the acknowledgement interrupt state register 234 receives the acknowledgement signal As from the slave device 100 via the direction controller 245, the shifter 244 and the FIFO register 243. Similarly, the non-acknowledgement interrupt state register 235 provides a second interrupt signal to the micro-controller 210 when the non-acknowledgement interrupt state register 235 receives the non-acknowledgement signal ~Am from the slave device 100 via the direction controller 245, the shifter 244 and the FIFO register 243. In the embodiment, the pin PIN1 is a bi-directional pin controlled by the direction controller 245. The direction controller 245 transmits the signal from the interface unit 230 to the slave device 100 via the pin PIN1. Furthermore, the direction controller 245 also receives the signal from the slave device 100 via the pin PIN1, and also transmits the received signal to the corresponding registers of the interface unit 230 via the FIFO register 243. In the embodiment, the micro-controller 210 can program the registers of the interface unit 230 according to a software or a firmware, so as to flexibly control the format of the serial data signal SDA, and then the micro-controller 210 can communicate with the slave devices that supply various I²C specifications.

Figure 3:
FIG. 3 shows a format table illustrating the serial data signals SDA of various commands that conform to the I²C bus standard.

FIG. 3 shows a format table 300 illustrating the serial data signals SDA of various commands that conform to the I²C bus standard. Referring to FIG. 2 and FIG. 3 together, if the IC 200 uses a quick command to perform a write operation for the slave device 100, the IC 200 sequentially transmits a start signal S and an address signal IDw to the slave device 100 via the pin PIN1. Next, the IC 200 receives an acknowledgement signal As from the slave device 100 via the pin PIN1. Next, the IC 200 transmits a stop signal P to the slave device 100 via the pin PIN1, thus completing the write operation of the quick command. Moreover, if the IC 200 uses a quick command to perform a read operation for the slave device 100, the IC 200 sequentially transmits a start signal S and an address signal IDr to the slave device 100 via the pin PIN1. Next, the IC 200 receives an acknowledgement signal As from the slave device 100 via the pin PIN1. Next, the IC 200 transmits a stop signal P to the slave device 100 via the pin PIN1, thus completing the read operation of the quick command. If the IC 200 uses a byte command to perform a write operation for the slave device 100, the IC 200 sequentially transmits a start signal S, an address signal IDw and a command signal CMND to the slave device 100 via the pin PIN1. Next, the IC 200 receives an acknowledgement signal As from the slave device 100 via the pin PIN1. Next, the IC 200 transmits a stop signal P to the slave device 100 via the pin PIN1, thus completing the write operation of the byte command. Furthermore, if the IC 200 uses a byte command to perform a read operation for the slave device 100, the IC 200 sequentially transmits a start signal S and an address signal IDr to the slave device 100 via the pin PIN1. Next, the IC 200 receives a data signal DATA0 from the slave device 100 via the pin PIN1. Next, the IC 200 transmits a non-acknowledgement signal ~Am and the stop signal P to the slave device 100 via the pin PIN1, thus completing the read operation of the byte command. It is to be noted that, the format table 300 is used as an example, and does not limit the invention.

Figure 4:
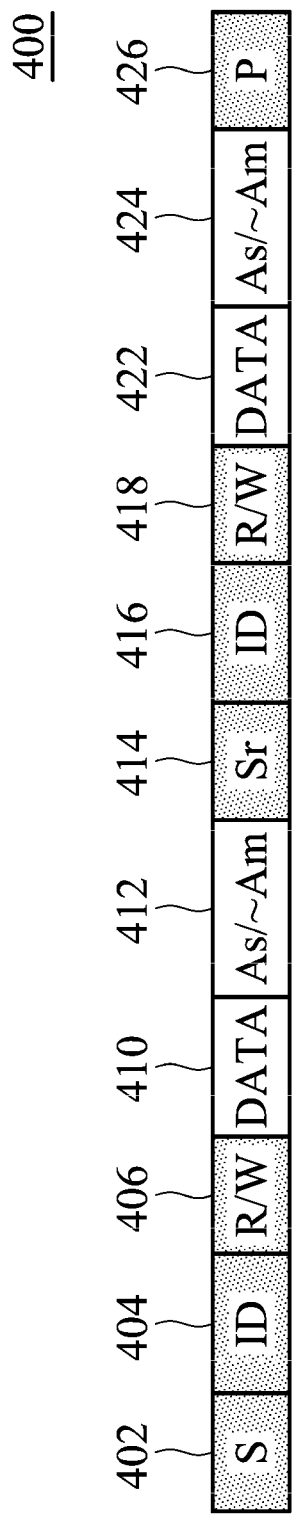
FIG. 4 shows a packet of the serial data signal SDA according to an embodiment of the invention.

FIG. 4 shows a packet 400 of the serial data signal SDA according to an embodiment of the invention. Referring to FIG. 2 and FIG. 4 together, the packet 400 is obtained by programming the registers of the interface unit 230 by the micro-controller 210 according to software or firmware. In the packet 400, field 402 comprises a start signal S. Next, field 404 comprises an address signal ID. Next, field 406 comprises a read signal R or a write signal W. Next, field 410 comprises the data signal DATA. Next, field 412 comprises the acknowledgement signal As or the non-acknowledgement signal ~Am. Next, field 414 comprises a repetition start signal Sr. Next, field 416 comprises the address signal ID, wherein the fields 416 and 404 have the same address signal ID. Next, field 418 comprises a read signal R or a write signal W. Next, field 422 comprises the data signal DATA. Next, field 424 comprises the acknowledgement signal As or the non-acknowledgement signal ~Am. Final, field 426 comprises a stop signal P. In the packet 400, the signal transmission directions of the fields 410 and 412 are determined by the read signal R or the write signal W of the field 406. Moreover, the signal transmission directions of the fields 422 and 424 are determined by the read signal R or the write signal W of the field 418. In one embodiment, the signals of the fields 402 and 414 are generated by programming the start control register 231 by the micro-controller 210. The signal of the field 426 is generated by programming the stop control register 232 by the micro-controller 210. The signals of the fields 404, 406, 410, 416, 418 and 422 are generated by programming the address/command/data register 233 by the micro-controller 210. Therefore, according to the format of the packet 400, the micro-controller 210 can determine whether to transmit the signal of each field based on the software or the firmware, so as to flexibly control the communication of the serial data signal SDA with the slave device 100, thereby having increased compatibilities.

It should be noted that, different slave devices have different data signal formats according to various commands. In the prior art, data signal formats corresponding to the slave devices that can be used in a system, should be pre-stored in the system. Thus, if the data signal formats corresponding to the slave devices that can be used in a system are not pre-stored, the slave devices cannot be operated. At this time, only similar slave devices having corresponding data signal formats that are pre-stored may be used. However, the micro-controller of the invention can program the registers of the I²C bus controller according to software or firmware, so as to flexibly modify the control data signal format, and then communicate with the slave devices that support various specifications. Therefore, for the slave devices of various specifications, the invention permits greater flexibility in use.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit for controlling a slave device, comprising:
   a pin;
   a micro-controller; and
   an inter integrated circuit ($I^2C$) bus controller coupled between the micro-controller and the pin, comprising:
   a transceiver unit coupled to the slave device via the pin, transferring serial data that conforms to $I^2C$ specification; and
   an interface unit coupled between the transceiver unit and the micro-controller, comprising:
   a start control register, providing a first start signal to the slave device via the transceiver unit when the start control register is programmed by the micro-controller; and
   a stop control register, providing a stop signal to the slave device via the transceiver unit when the stop control register is programmed by the micro-controller,
   wherein the start control register provides a second start signal between the first start signal and the stop signal to the slave device via the transceiver unit when the start control register is programmed by the micro-controller,
   wherein the micro-controller programs the stop control register according to an interrupt signal from the interface unit.

2. The integrated circuit as claimed in claim 1, wherein the $I^2C$ bus controller further comprises:
   an acknowledgement interrupt state register, providing the interrupt signal to the micro-controller when the transceiver unit receives a first acknowledgement signal from the slave device,
   wherein the slave device provides the first acknowledgement signal according to the first start signal.

3. The integrated circuit as claimed in claim 2, wherein when the micro-controller programs the acknowledgement interrupt state register, the acknowledgement interrupt state register provides a second acknowledgement signal to the slave device via the transceiver unit.

4. The integrated circuit as claimed in claim 1, wherein the $I^2C$ bus controller further comprises:
   a non-acknowledgement interrupt state register, providing the interrupt signal to the micro-controller when a first non-acknowledgement signal from the slave device is received via the transceiver unit,
   wherein the micro-controller further programs the stop control register in response to the interrupt signal,
   wherein the slave device provides the first non-acknowledgement signal according to the first start signal.

5. The integrated circuit as claimed in claim 4, wherein the micro-controller programs the non-acknowledgement interrupt state register, the non-acknowledgement interrupt state register provides a second non-acknowledgement signal to the slave device via the transceiver unit.

6. The integrated circuit as claimed in claim 1, wherein the $I^2C$ bus controller further comprises:
   a data register, providing an address signal and a read/write signal to the slave device via the transceiver unit when the data register is programmed by the micro-controller,
   wherein the micro-controller programs the data register after the start control register is programmed.

7. The integrated circuit as claimed in claim 6, wherein after the data register provides the read/write signal, the micro-controller programs the data register, such that the data register provides a command signal or a first data signal to the slave device via the transceiver unit.

8. The integrated circuit as claimed in claim 7, wherein the transceiver unit of the $I^2C$ bus controller comprises:
   an acknowledgement interrupt state register, providing the interrupt signal to the micro-controller when the transceiver unit receives an acknowledgement signal from the slave device;
   a non-acknowledgement interrupt state register, providing the interrupt signal to the micro-controller when a non-acknowledgement signal from the slave device is received via the transceiver unit;
   a first first-in-first-out (FIFO) register coupled to the start control register, the stop control register and the data register, generating first information according to the first start signal, the stop signal, the address signal, the read/write signal, the command signal or the first data signal;
   a second FIFO register coupled to the data register, the acknowledgement interrupt state register and the non-acknowledgement interrupt state register, generating second information to the interface unit according to the acknowledgement signal, the non-acknowledgement signal and a second data signal from the slave device;
   a first shifter, providing the first information from the first FIFO register to the slave device via the pin; and
   a second shifter, transmitting the acknowledgement signal, the non-acknowledgement signal and the second data signal from the slave device to the second FIFO register via the pin.

9. The integrated circuit as claimed in claim 8, wherein the second FIFO register transmits the second information corresponding to the acknowledgement signal to the acknowledgement interrupt state register, transmits the second information corresponding to the non-acknowledgement signal to the non-acknowledgement interrupt state register, and transmits the second information corresponding to the second data signal to the data register.

10. A control method for an inter integrated circuit ($I^2C$) bus controller, wherein the $I^2C$ bus controller comprises a transceiver unit coupled to a slave device, the control method comprising:
    providing a packet comprising a plurality of signals to the slave device via the transceiver unit by programming a plurality of registers of the $I^2C$ bus controller, wherein the packet has a specific format that conforms to $I^2C$ specification, and the specific format of the packet comprises a first start signal and a stop signal,
    wherein the first start signal is generated by programming a start control register of the $I^2C$ bus controller, and the stop signal is generated by programming a stop control register of the $I^2C$ bus controller,
    wherein the specific format further comprises a second start signal between the first start signal and the stop signal, wherein the second start signal is generated by programming the start control register of the I2C bus controller.

11. The control method as claimed in claim 10, wherein the specific format further comprises:

a first address signal between the first start signal and the stop signal, wherein the first address signal is generated by programming a data register of the I²C bus controller; and a first read/write signal between the first address signal and the stop signal, wherein the first read/write signal is generated by programming the data register of the of the 120 bus controller.

12. The control method as claimed in claim 11, wherein the slave device provides a first response signal between the first read/write signal and the stop signal to the I²C bus controller, wherein the first response signal is an acknowledgement signal or a non-acknowledgement signal.

13. The control method as claimed in claim 11, wherein the specific format further comprises a first data signal between the first read/write signal and the stop signal, wherein the first read/write signal is used to indicate a transmission direction between the I²C bus controller and the slave device for the first data signal.

14. The control method as claimed in claim 13, wherein the slave device provides a first response signal between the first data signal and the stop signal to the I²C bus controller, wherein the first response signal is an acknowledgement signal or a non-acknowledgement signal.

15. The control method as claimed in claim 10, wherein the specific format further comprises:
a second address signal between the second start signal and the stop signal, wherein the second address signal is generated by programming a data register of the I²C bus controller; and a second read/write signal between the second address signal and the stop signal, wherein the second read/write signal is generated by programming the data register of the of the I²C bus controller.

16. The control method as claimed in claim 15, wherein the slave device provides a second response signal between the second read/write signal and the stop signal to the I²C bus controller, wherein the second response signal is an acknowledgement signal or a non-acknowledgement signal.

17. The control method as claimed in claim 15, wherein the specific format further comprises
a second data signal between the second read/write signal and the stop signal, wherein the second read/write signal is used to indicate a transmission direction between the I²C bus controller and the slave device for the second data signal.

18. The control method as claimed in claim 17, wherein the slave device provides a second response signal between the second data signal and the stop signal to the I²C bus controller, wherein the second response signal is an acknowledgement signal or a non-acknowledgement signal.

19. The control method as claimed in claim 10, wherein a micro-controller programs the I²C bus controller according to the specific format of the packet, such that the I²C bus controller generates the packet to the slave device.

* * * * *